(12) United States Patent
Cousins et al.

(10) Patent No.: US 6,920,468 B1
(45) Date of Patent: Jul. 19, 2005

(54) EVENT OCCURRENCE DETECTION METHOD AND APPARATUS

(75) Inventors: William R. Cousins, Columbia, SC (US); Franz Badias, Lexington, SC (US); William S. Means, Columbia, SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/111,849

(22) Filed: Jul. 8, 1998

(51) Int. Cl.[7] .............................................. G06F 17/30
(52) U.S. Cl. ............................... 707/203; 707/6; 707/7; 707/10; 707/201; 707/9; 709/203; 709/224
(58) Field of Search ............................. 707/9, 203, 10, 707/201, 6, 7, 1; 709/225, 229, 224

(56) References Cited

U.S. PATENT DOCUMENTS

| | | | | |
|---|---|---|---|---|
| 3,906,454 A | | 9/1975 | Martin ...................... 340/172.5 |
| 4,206,346 A | | 6/1980 | Hirosawa et al. ............... 235/92 |
| 4,241,445 A | * | 12/1980 | Payen ......................... 714/704 |
| 4,339,657 A | * | 7/1982 | Larson et al. ................ 714/704 |
| 4,816,654 A | * | 3/1989 | Anderl et al. ................. 235/380 |
| 4,882,474 A | * | 11/1989 | Anderl et al. ................. 235/380 |
| 5,210,795 A | * | 5/1993 | Lipner et al. .................. 380/23 |
| 5,223,827 A | * | 6/1993 | Bell et al. .............. 340/825.06 |
| 5,475,839 A | * | 12/1995 | Watson et al. .................. 713/2 |
| 5,590,056 A | | 12/1996 | Barritz ........................ 364/550 |
| 5,606,663 A | | 2/1997 | Kadooka ............... 395/188.01 |
| 5,675,510 A | | 10/1997 | Coffey et al. ........... 364/514 A |
| 5,774,058 A | * | 6/1998 | Henry et al. ........... 340/825.31 |
| 5,933,821 A | * | 8/1999 | Matsumoto et al. ........... 707/1 |
| 5,987,611 A | * | 11/1999 | Freund ........................ 713/201 |
| 6,004,276 A | * | 12/1999 | Wright et al. ................ 600/508 |
| 6,026,440 A | * | 2/2000 | Shrader et al. ............. 709/224 |
| 6,044,439 A | * | 3/2000 | Ballard et al. .............. 711/137 |

\* cited by examiner

*Primary Examiner*—Jean M. Corrielus
(74) *Attorney, Agent, or Firm*—Maginot, Addison & Moore LLP

(57) ABSTRACT

One step of a method of detecting when a certain number of events occur within a time frame causes a database having several event records to include a first event record in response to a first event occurring. Another step of the method updates the first database record in response to each event that occurs within a first period from the first event occurring. The first period being based upon the time frame. The method also determines, based upon the several event records, that the certain number of events occurred within the time frame. An apparatus which detects when a certain number of events occur within a time frame is also disclosed.

6 Claims, 5 Drawing Sheets

Event Frequency Table — 42

| | idEvent | dtExpire | cCountDown |
|---|---|---|---|
| 40₁ | 20200 | 3014200 | 1 |
| 40₂ | 20100 | 3014200 | 1 |
| 40₃ | 20200 | 3015000 | 2 |
| 40₄ | 20300 | 3015000 | 15 |
| 40₅ | 20400 | 3150000 | 5 |
| 40₆ | 20300 | 3015100 | 14 |
| | 44 | 46 | 48 |
| ... | | | |
| 40_{K-1} | 20400 | 3150500 | 4 |
| 40_K | 20200 | 3015050 | 1 |

FIG. 2

```
1   EventFrequencyTable.AddRecord(idEvent, cTimePeriod, cOccurrences)
2       New Record
3       Record.idEvent = idEvent
4       Record.dtExpire = DateTimeNow() + cTimePeriod
5       Record.cCountDown = cOccurrences
6       DatabaseCommand.AddRecord(Record)
7   End EventFrequencyTable.AddRecord
```

FIG. 4

```
1   Boolean EventFrequencyTest(idEvent)
2       Status = False
3       For Each Record In EventFrequencyTable
4           If Record.dtExpire < DateTimeNow() Then
5               Record.Delete
6           Else If Record.idEvent = idEvent Then
7               Record.cCountDown = Record.cCountDown - 1
8               If Record.cCountDown = 0 Then
9                   Record.Delete
10                  Status = True
11              End If
12          End If
13      End For
14      Return Status
15  End EventFrequencyTest
```

Event Frequency Table After Event E1

| idEvent | dtExpire | cCountDown |
|---|---|---|
| 1 | 131 | 1 |

Status = False

Event Frequency Table After Event E2

| idEvent | dtExpire | cCountDown |
|---|---|---|
| 1 | 131 | 1 |
| 2 | 136 | 2 |

Status = False

Event Frequency Table After Event E3

| idEvent | dtExpire | cCountDown |
|---|---|---|
| 2 | 136 | 1 |
| 2 | 142 | 2 |

Status = False

Event Frequency Table After Event E4

| idEvent | dtExpire | cCountDown |
|---|---|---|
| 2 | 136 | 1 |
| 2 | 142 | 2 |
| 1 | 138 | 1 |

Status = False

Event Frequency Table After Event E5

| idEvent | dtExpire | cCountDown |
|---|---|---|
| 2 | 142 | 2 |
| 1 | 142 | 1 |

Status = True

Event Frequency Table After Event E6

| idEvent | dtExpire | cCountDown |
|---|---|---|
| 2 | 142 | 1 |
| 1 | 142 | 1 |
| 2 | 150 | 2 |

Status = False

Event Frequency Table After Event E7

| idEvent | dtExpire | cCountDown |
|---|---|---|
| 2 | 150 | 2 |
| 1 | 148 | 1 |

Status = False

Event Frequency Table After Event E8

| idEvent | dtExpire | cCountDown |
|---|---|---|
| 2 | 150 | 1 |
| 1 | 148 | 1 |
| 2 | 156 | 2 |

Status = False

Event Frequency Table After Event E9

| idEvent | dtExpire | cCountDown |
|---|---|---|
| 1 | 148 | 1 |
| 2 | 156 | 1 |
| 2 | 157 | 2 |

Status = True

EVENT OCCURRENCE DETECTION METHOD AND APPARATUS

BACKGROUND OF THE INVENTION

The present invention relates generally to detecting event occurrences, and more particularly to method and apparatus that detect when a certain number of events occur within a time frame.

Computer systems commonly need to perform actions in response to a defined condition being satisfied. In particular, a computer system may need to perform certain actions in response to a particular event occurring a certain number of times within a specified time frame. For example, it may be desirable for a computer system to deactivate a user account in response to detecting that more than five bad login attempts have been made within a ten minute time frame.

Some known computer systems detect whether a particular event occurs a certain number of times within set time intervals. To this end, these known computer systems define time intervals based upon a time frame of interest and count the number of events that occur within each defined time interval. For example, these known computer systems may split an hour into six separate 10 minute intervals and determine based upon the number of events within each 10 minute interval that the event occurred more than a desired amount of times within a single 10 minute interval.

While this scheme works well in some instances, the scheme does not detect whether the event occurred more than a desired number of times within a specified time frame. Referring to the above example of six 10 minute intervals, if the event occurred 3 times within the last 3 minutes of a first 10 minute interval and occurred 3 times within the first 3 minutes of a second 10 minute interval, the known computer systems would not detect that the event occurred more than 5 times within a 10 minute time frame that spanned the last 3 minutes of the first 10 minute interval and the first 3 minutes of the second 10 minute interval.

Moreover, known computer systems track event occurrences by maintaining software variables whose values are stored in volatile memory. Since it may be desirable to perform actions in response to a certain number of events occurring within a relatively long time frame that may spans days, weeks, or even months, there is a high likelihood that the known computer systems would lose count of events due to (i) the computer system being powered down or restarted, or (ii) the software service that tracks the events being shut down or restarted.

Accordingly, there is a need for a method and apparatus that determine whether a particular event has occurred a certain number of times within a specified time frame that is not limited to set time intervals. Moreover, there is a need for a method and apparatus that may reliably determine whether a particular event has occurred a certain number of times within a relatively long time frame.

SUMMARY OF THE INVENTION

In accordance with one embodiment of the present invention, there is provided a method of detecting when a certain number of events occur within a time frame. One step of the method includes causing a database having several event records to include a first event record in response to a first event occurring. Another step of the method includes updating the first database record in response to each event that occurs within a first period from the first event occurring. The first period being based upon the time frame. The method also includes the step of determining based upon the several event records that the certain number of events occurred within the time frame.

Pursuant to another embodiment of the present invention, there is provided a method of performing an action in response to a certain number of events of an event type occurring within a time frame. One step of the method includes updating a first count value in response to each event of the event type that occurs within a first period from a first event of the event type occurring. The first period is based upon the time frame. Another step of the method includes updating a second count value in response to each event to the event type that occurs within a second period from a second event of the event type ocurring. The second period is also based upon the time frame. The method also includes performing the action if (i) the first count value indicates that the certain number of events of the event type has occurred within the time frame, or (ii) the second count value indicates that the certain number of events of the event type has occurred within the time frame.

Pursuant to yet another embodiment of the present invention, there is provided a computer readable medium that configures a processor to perform an action in response to a certain number of events of an event type occurring within a time frame. The computer readable medium includes a plurality of instructions which when executed by the processor causes the processor to update a first count value in response to each event of the event type that occurs within a first period from a first event of the event type occurring. The first period based upon the time frame. The plurality of instructions which when executed by the processor also causes the processor to update a second count value in response to each event of the event type that occurs within a second period from a second event of the event type occurring. The second period based upon the time frame. The plurality of instructions which when executed by the processor further causes the processor to perform the action if (i) the first count value indicates that the certain number of events of the event type has occurred within the time frame, or (ii) the second count value indicates that the certain number of events of the event type has occurred within the time frame.

It is an object of the present invention to provide a new and useful method and apparatus for detecting event occurrence frequency.

It is another object of the present invention to provide an improved method and apparatus for detecting event occurrence frequency.

It is an additional object of the present invention to provide a method and apparatus that detect whether a particular event occurred more than a certain number of times within a time frame.

It is yet another object of the present invention to provide a method and apparatus that detect whether a particular event occurred more than a certain number of times within a time frame that may span days, weeks, or months.

The above and other objects, features, and advantages of the present invention will become apparent from the following description and the attached drawings.

DETAILED DESCRIPTION OF A PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
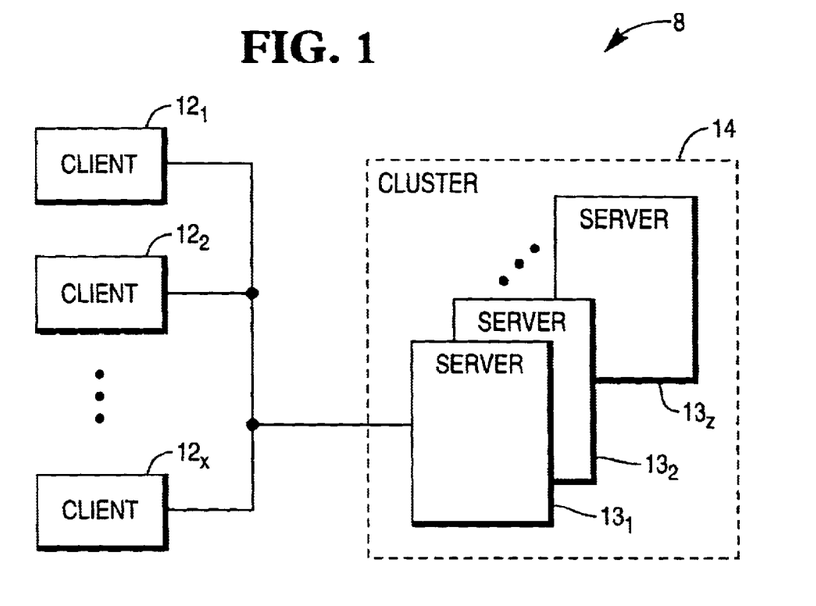
FIG. 1 shows a simplified block diagram of a computer network upon which a management system that incorporates features of the present invention may be implemented.

FIG. 1 illustrates a computer network 8 upon which a management system 10 (see FIG. 2) may be implemented. The computer network 8 in a preferred embodiment includes client computers $12_1 \ldots 12^x$ which are connected to a Microsoft Windows NT server $13_Y$ or a cluster 14 of Microsoft Windows NT servers $13_1 \ldots 13_Z$ that execute various software routines.

Figure 2:
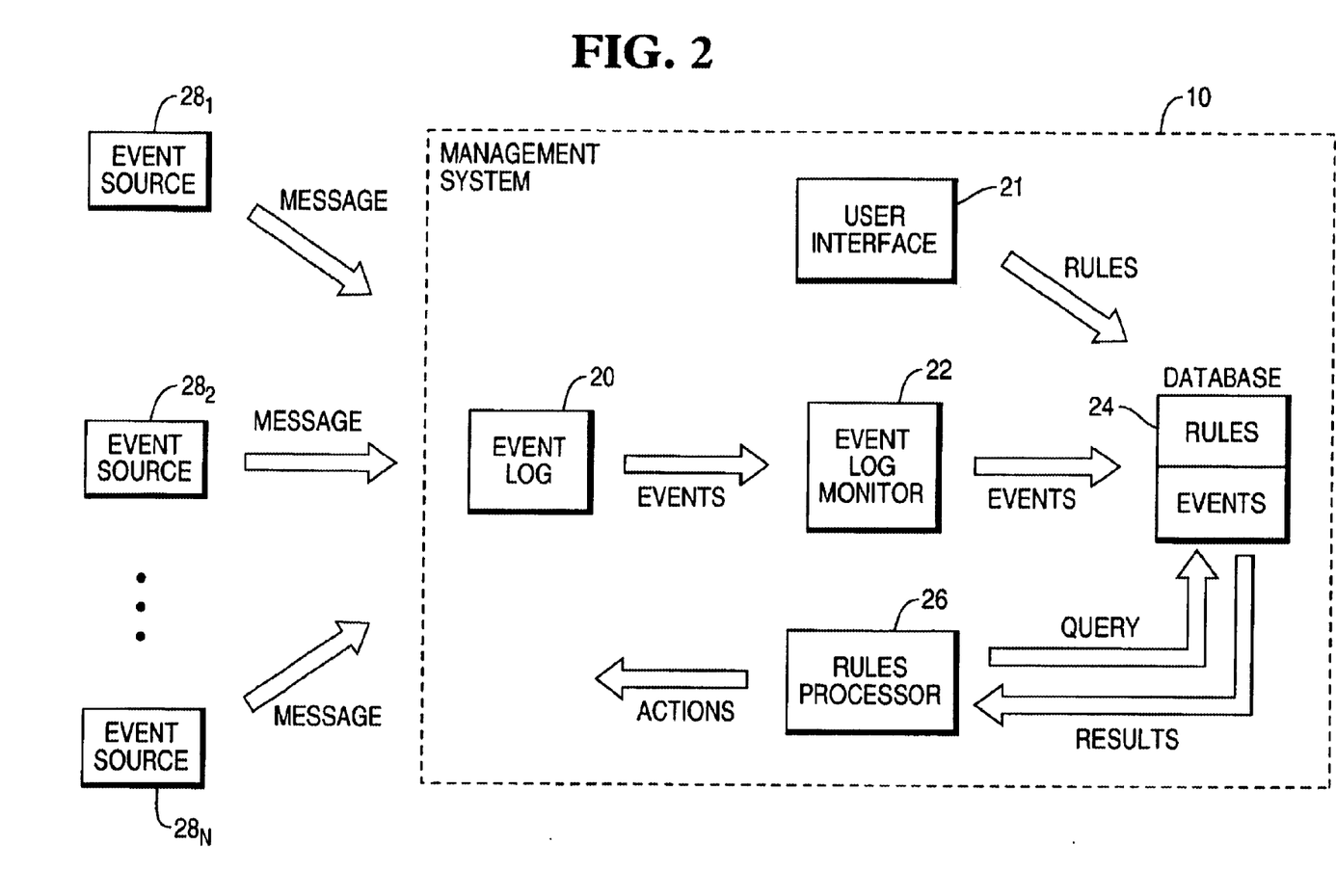
FIG. 2 shows a simplified diagram of the management system that may be implement upon the computer network of FIG. 1.

A simplified functional diagram of the management system 10 is illustrated in FIG. 2. The various functional components illustrated in FIG. 2 may be (i) implemented upon a single server $13_y$, (ii) distributed across the servers $13_1 \ldots 13_Z$ of the cluster 14, or (iiii) distributed across the client computers $12_1 \ldots 12_X$ and the servers $13_1 \ldots 13_Z$ of the cluster 14. Moreover, while the invention is disclosed in a Microsoft Windows NT server environment, features of the present invention may be implemented in other environments.

As illustrated in FIG. 2, the management system 10 includes an event log 20, a user interface 21, an event log monitor 22, a database 24, and a rules processor 26. The event log 20 is operable to store event information obtained from event messages generated by event sources $28_1 \ldots 28_N$. Each event source $28_M$ is generally a software application that has registered with the management system 10. Moreover, each event source $28_M$ generally generates an event message after the event source $28_M$ (i) performs various functions, and/or (ii) encounters various conditions. For example, an event source $28_M$ may generate an event message in response to the event source $28_M$ encountering a disk error.

The user interface 21 provides a graphical interface that enables a user to (i) define rules, and (ii) associate an action or a group of actions to each defined rule. In particular, the user interface 21 allows a user to define a rule as a set of user established conditions that must be satisfied before the associated actions are executed. For example, a rule may establish (i) where a specific event must occur (e.g. a specified computer, work group, or domain), (ii) when a specific event must occur (e.g. a specified day, time, range of times, etc.), or (iii) a certain number of times a particular event must occur in a time frame before the event triggers an action.

The actions associated with the rules in the preferred embodiment may include notifying, logging, or running a pre-determined application. For example, execution of an action may cause the management system 10 to (i) send a page, (ii) send an e-mail, (iii) log an event to the printer, or (iv) run a diagnostic application. Moreover, an action may include several actions to be executed when the associated rule is satisfied. In other words, the rules processor 26 may cause several actions to occur such as notifying various applications, logging various information, and running various applications all in response to conditions of a single rule being satisfied.

The database 24 is operable to store event information and user defined rule information used by the management system 10. In particular, the database 24 is operable to store the information in response to database commands received from the event log monitor 22 and the user interface 21. Moreover, the database 24 (i) receives database queries that request information stored in the database 24, and (ii) generates database result tables that include the requested information in response to processing the received database queries.

In a preferred embodiment of the present invention, the database 24 utilizes non-volatile read/write storage (e.g. a disk drive, or RAID device) to store the various records of data in a persistent manner. Accordingly, the information remains stored in the database 24 even after (i) a computer system which is implementing the database 24 is shut down or restarted, or (ii) a computer process (i.e. a software application or service) that is implementing the interface to the database 24 is shut down or restarted. Moreover, in the preferred embodiment of the present invention, the database 24 is implemented as a Microsoft SQL (structured query language) database in which records of data are stored in a conventional manner; however, the database 24 of the management system 10 may be implemented to utilize a different database structure.

The event log monitor 22 is operable to monitor the contents of the event log 20. Moreover, the event log monitor 22 is operable to generate database commands in response to additional information being added to the event log 20. In particular, the event log monitor 22 is operable to generate database commands that cause event records $40_1 \ldots 40_K$ to be added to an event frequency table 42 that is stored in the database 24.

Figure 3:
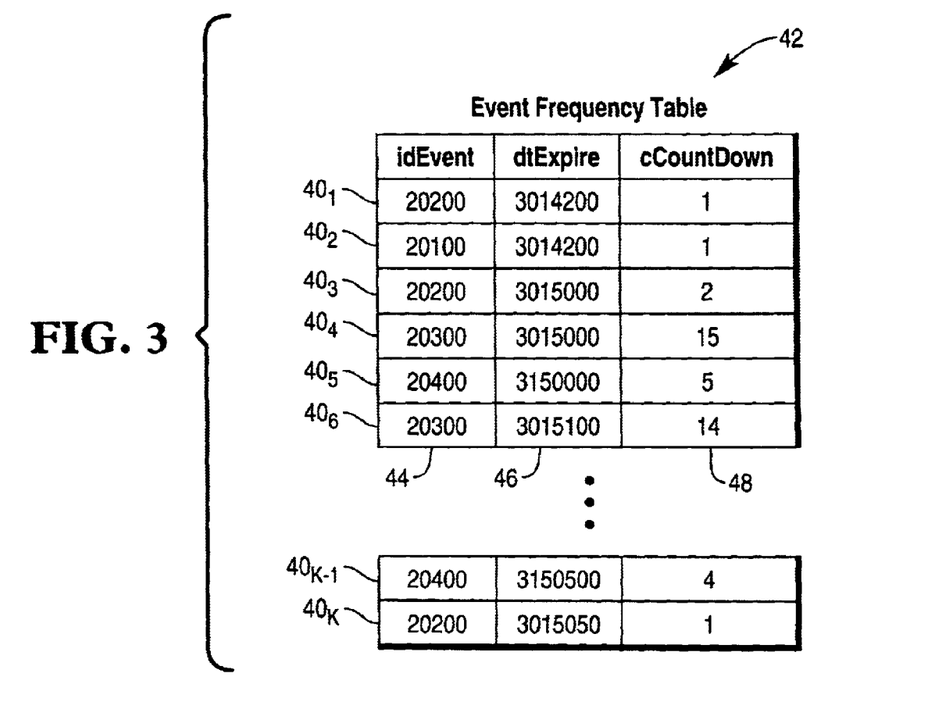
FIG. 3 shows an exemplary event frequency table utilized by the management system of FIG. 2.
Figure 4:
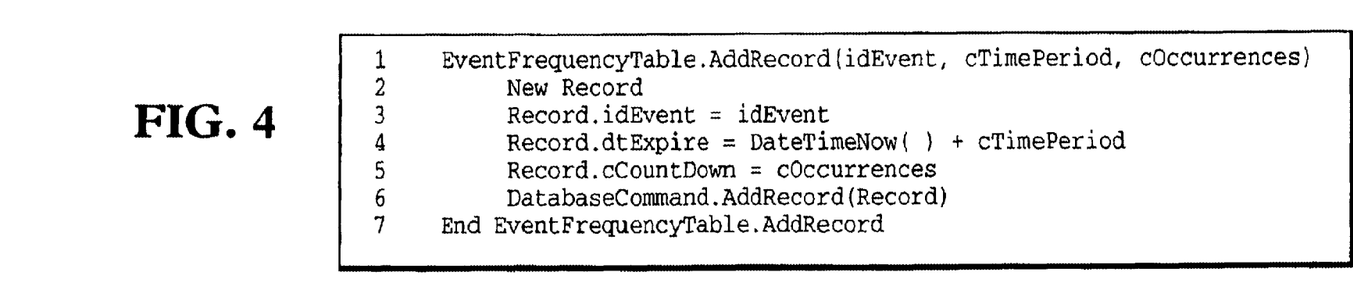
FIG. 4 shows a pseudo-code representation of a software routine that configures a processor to cause an event record to be added to the event frequency table of FIG. 3.

As shown in FIG. 3, the event frequency table 42 includes event records $40_1 \ldots 40_K$ that include information associated with an event logged in the event log 20. In particular, each event record $40_J$ represents a separate occurrence of an event and includes an event identifier field 44, an expiration field 46, and a count field 48. The event identifier field 44 is operable to store an event identifier idEvent that is representative of the event type for the event occurrence which caused the event record $40_J$ to be added to the event frequency table 42. The expiration field 46 is operable to store an expiration value dtExpire that is representative of the date and time when the event record $40_J$ will expire and be removed from the event frequency table 42. The count field 48 is operable to store a count value cCountDown that is representative of the number of event occurrences that must be recognized before an associated action is triggered.

In order to add an event record $40_J$ to the event frequency table 42, the event log monitor 22 is operable to execute a software routine EventFrequencyTable.AddRecord( ) in response to each event (i) logged to the event log 20 and (ii) required by a defined rule to occur a certain number of times within a specified time frame. A pseudo-code representation of the software routine EventFrequencyTable.AddRecord( ) is shown in FIG. 3. The software routine EventFrequencyTable.AddRecord( ) may be reduced to a set of instructions that may be (i) stored on or in a computer readable medium, and (ii) executed by a processor or a combination of processors of the management system 10. In particular, when a processor of the management system 10 executes the set of instructions, the management system 10 causes an event record $40_J$ to be added to the event frequency table 42 maintained in the database 24.

To this end, the software routine EventFrequencyTable.AddRecord( ) causes the management system 10 to add to the event frequency table 42 an event record $40_J$ whose contents are based upon an event identifier idEvent, a time frame cTimeFrame, and an occurrence value cOccurrences. The event identifier idEvent is obtained from the event log 20 and represents the event type for the event occurrence which caused the event to be logged in the event log 20. The time frame cTimeFrame is obtained from a defined rule and indicates a time span such as a span of seconds, minutes, days, weeks, months, years which is represented in standard units such as milliseconds, seconds, minutes, hours. For example, if the time frame cTimeFrame utilizes a standard unit of one second, then a value of 86,400 for the time frame cTimeFrame is indicative of a one day time span. The occurrence value cOccurrences is obtained from a defined rule and represents the number of events that must occur within the time fame cTimeFrame in order for the actions associated with the defined rule to be triggered.

In particular, execution of line 2 of the software routine EventFrequencyTable.AddRecord( ) causes a new event record $40_J$ to be generated. Moreover, execution of lines 3 through 5 of the software routine EventFrequencyTable.AddRecord( ) causes the management system 10 to store appropriate information in the event identifier field 44, the expiration field 46, and the count field 48 of the newly generated event record $40_J$. More specifically, in response to executing line 3, the management system 10 stores the event identifier idEvent obtained from the event log 20 in the event identifier field 44. By storing the event identifier idEvent in the event identifier field 44, the management system 10 associates the information stored in the newly generated event record $40_J$ with events of the type represented by the event identifier idEvent.

Furthermore, execution of line 4 of the software routine EventFrequencyTable.AddRecord( ) causes the management system 10 to obtain a representation of the current date and time. Moreover, execution of line 4 causes the management system to (i) add the time frame cTimeFrame obtained from a defined rule to the obtained current date and time, and (ii) store the sum in the expiration field 46. Accordingly, the expiration field 46 contains an expiration value that represents when the time frame cTimeFrame no longer includes the event which caused the generation of the event record $40_J$.

Execution of line 5 of the software routine EventFrequencyTable.AddRecord( ) causes the management system 10 to store the occurrence value cOccurrences obtained from a defined rule in the count field 48. By storing the occurrence value cOccurrences in the count field 48, the management system 10 causes the newly generated event record $40_J$ to contain a count value that is representative of the number of times the event must occur before triggering an action. Finally, the management system 10 by executing line 6 of the software routine EventFrequencyTable.AddRecord( ) causes the database 24 to store the newly generated event record $40_J$ in the event frequency table 42.

Referring back to FIG. 2, the rules processor 26 of the management system 10 is operable to process user defined rules. In particular, the rules processor 26 is operable to (i) determine whether the conditions of a defined rule have been satisfied, and (ii) trigger the actions associated with the defined rule in response to determining that the defined rule has been satisfied. Since the rules processed by the rules processor 26 may include conditions that require a particular event to occur a certain number of times within a specified time frame, the rules processor 26 must be able to determine whether a particular event has occurred the certain number of times within the specified time frame.

To this end, the rules processor 26 is operable to cause the software function EventFrequencyTest( ) to be executed in order to determine based upon an event identifier idEvent whether a particular event has occurred a certain number of times within a specified time frame. In particular, the software function EventFrequencyTest( ) is a Boolean function that (i) updates information contained in the event frequency table 42, and (ii) generates a truth value of either true or false based upon the information contained in the event frequency table 42. In the preferred embodiment of the present invention, the rules processor 26 is operable to execute the software function EventFrequencyTest( ) in response to each time the event log monitor 22 causes an event record $40_J$ to be added to the event frequency table 42.

Figure 5:
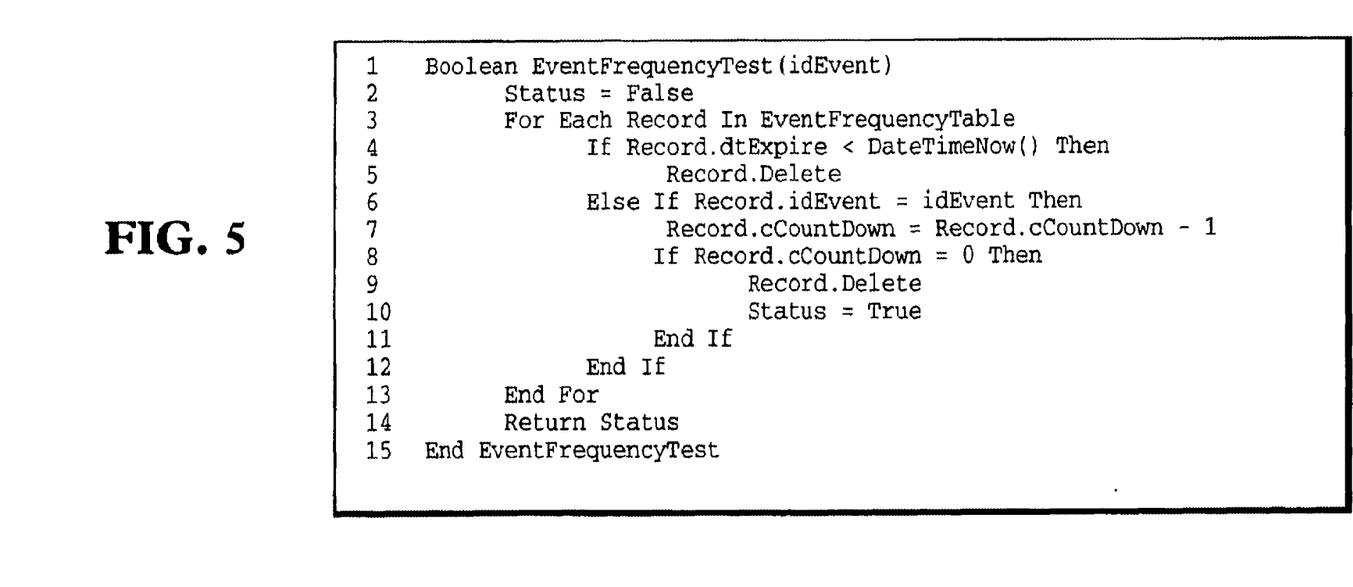
FIG. 5 shows a pseudo-code representation of a software function that configures a processor to update information of the event frequency table of FIG. 3 and generate a truth value representative of whether a condition has been satisfied.

A pseudo-code representation of the software function EventFrequencyTest( ) is shown in FIG. 5. The software function EventFrequencyTest( ) may be reduced to a set of instructions that may be (i) stored on or in a computer readable medium, and (ii) executed by a processor or a combination of processors of the management system 10. In particular, when a processor of the management system 10 executes the set of instructions, the management system 10 determines whether events of a particular event type represented by an event identifier idEvent has occurred a certain number of times within a specified time frame as defined by a rule of the management system 10.

In general, the management system 10 in response to executing the software function EventFrequencyTest( ) causes (i) each event record $40_1 \ldots 40_K$ that has expired to be removed from the event frequency table 42, and (ii) the count value stored in each event record $40_1 \ldots 40_K$ to be updated for each event record $40_1 \ldots 40_K$ that is associated with events of the particular event type. More specifically, as a result of executing line 4 of the software function EventFrequencyTest( ), the management system 10 determines whether the expiration value dtExpire stored in each event record $40_1 \ldots 40_K$ is less than a current date and time value returned by the function DateTimeNow( ).

If the expiration value dtExpire is less than the current date and time value, then the management system 10 executes line 5 of the software function EventFrequencyTest( ) which causes the expired event record $40_J$ to be removed from the event frequency table 42. However, if the expiration value dtExpire is not less than the current date and time value, then the management system 10 determines for each non-expired event record $40_1 \ldots 40_K$ whether the event record corresponds to an event of the same event type as the current event that caused the software function EventFrequencyTest( ) to be executed. Specifically, the management system 10 by executing line 6 of the software function EventFrequencyTest( ) determines that an event record $40_J$ corresponds to an event of the same event type as the current event if the event identifier idEvent stored in the event field 44 of the event record $40_J$ is equal to the event identifier idEvent of the current event.

If the event record $40_J$ does not correspond to an event of the same event type as the current event, then the management system 10 proceeds to processing the next event record $40_{J+1}$ of the event frequency table 42. However, if the event record $40_J$ does correspond to an event of the same event type as the current event, then the management system 10 (i) updates the count value cCountDown stored in the count field 48 of the event record $40_J$, and (ii) determines whether the updated count value has reached a threshold value.

To this end, the management system 10 executes line 7 of the software function EventFrequencyTest( ) in order to decrease the count value cCountDown stored in the count field 48 of the event record $40_J$ by one. It should be appreciated that the software function could utilize other manners of updating the count value. For example, the software function EventFrequencyTest( ) could be altered to (i) decrease the count value cCountDown by a different amount, or (ii) increase the count value cCountDown by 1 or another incremental value. Moreover, it should be appreciated that altering the manner in which the count value cCountDown is updated would likely require a change to the threshold value, and/or the initial value used for the count value cCountDown.

By executing line 8, the management system 10 determines that the updated count value cCountDown' has satisfied a predetermined relationship to the threshold value if the updated count value cCountDown' is equal to zero. It should be appreciated that while the software function EventFrequencyTest( ) is described utilizing a threshold value of zero, the management system 10 may be modified to utilize a threshold value of a different magnitude. The management system 10 could be modified to adjust the initial count values cCountDown stored in the event records in order to accommodate for the threshold value having the different magnitude. Alternatively, each event type may have a separate threshold value that is stored in an additional field of the event records $40_1 \ldots 40_K$ and compared to the corresponding count values in order to determine whether the event has occurred the required number of times.

If the rules processor 26 determines that the count value cCountDown has reached the threshold value, then the rules processor causes (i) the event record $40_J$ to be removed from the event frequency table 42 (line 9), and (ii) update the status value Status returned by the software function EventFrequencyTest( ) to a truth value of true (line 9).

After processing each event record $40_1 \ldots 40_K$ in the event frequency table 42, the management system 10 upon executing line 14 of the software function EventFrequencyTest( ) returns the status value Status. Since the management system 10 in line 2 of the software function EventFrequencyTest( ) initially sets the status value Status to a truth value of false, the management system 10 returns a status value Status of false unless the management system 10 updates the status value Status to a truth value of true in response to executing line 10. As stated above, the management system 10 only executes line 10 of the software function EventFrequencyTest( ) if the count value cCountDown of one of the event records $40_1 \ldots 40_K$ reaches the threshold value. Accordingly, execution of the software function EventFrequencyTest( ) only returns a true value if the count value cCountDown of one of the event records $40_1 \ldots 40_K$ reaches the threshold value. The rules processor 26 may use the status of the returned value to determine whether a condition has been satisfied that requires events of a particular event type to occur a certain number of times within a specified time frame.

Figure 6:
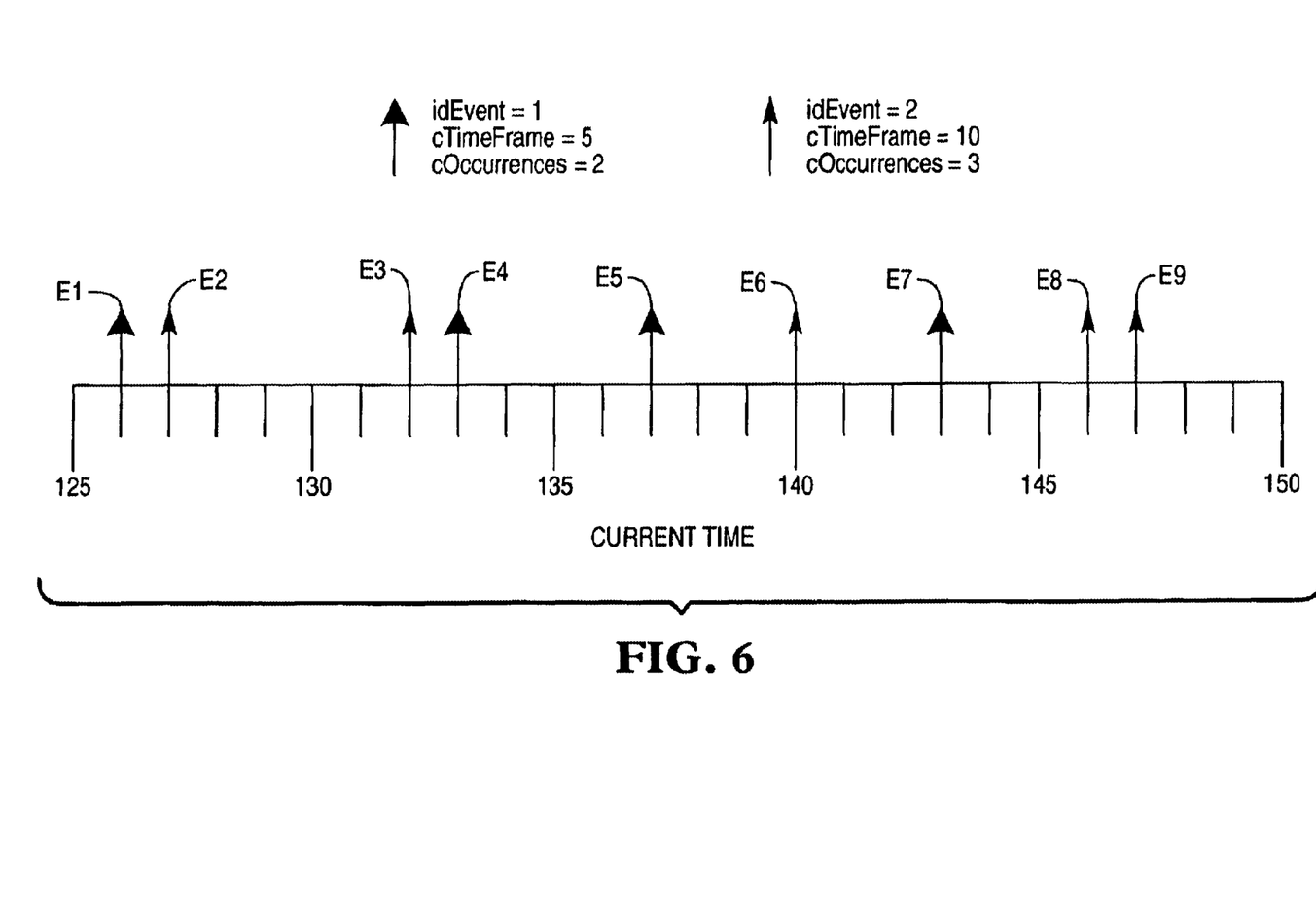
FIG. 6 shows an exemplary sequence of event occurrences that may be processed by the management system of FIG. 2.

FIG. 6 illustrates a sequence of events of two different event types. In particular, FIG. 6 illustrates four events E1, E4, E5, and E7 that are of a first event type represented by an event identifier idEvent equal to 1. Moreover, FIG. 6 illustrates five events E2, E3, E6, E8, and E9 of a second event type represented by an event identifier idEvent equal to 2. The sequence of events occur in a span of time running from a first time represented by 125 time units to a second time represented by 150 time units. It should be appreciated that the illustrated time values are merely exemplary and that in practice the time values are typically much larger.

Figure 7:
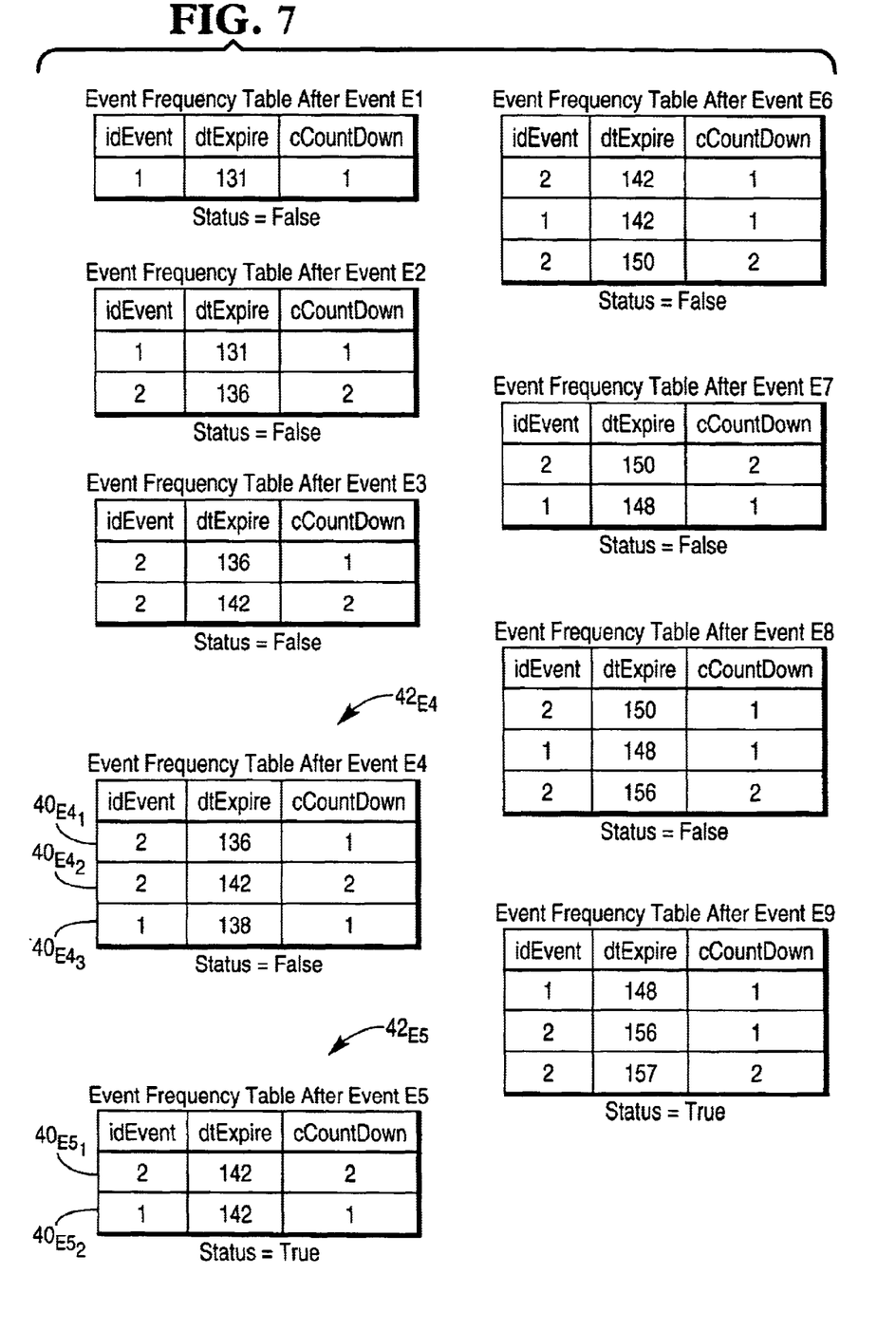
FIG. 7 shows the contents of the event frequency table as the management system of FIG. 2 processes the sequence of event occurrences of FIG. 6.

FIG. 7 shows the status of the event frequency table 42 and the values returned by the software function EventFrequencyTest( ) in response to processing the sequence of events shown in FIG. 6. In particular, FIG. 7 shows the information stored in the event frequency table 42 due to the management system 10 executing the software routine EventFrequencyTable.AddRecord( ) and the software function EventFrequencyTest( ) in response to each event E1 . . . E9 of FIG. 6. The information depicted in FIG. 7 assumes that the rules of the management system 10 define two conditions that require events of a particular event type to occur a certain number of time within a specified time frame. The first condition requires that events of the first event type represented by an event identifier idEvent of 1 to occur 2 times in a time frame cTimeFrame of 5 units. The second condition requires that events of the second event type represented by the event identifier idEvent of 2 to occur 3 times in a time frame cTimeFrame of 10 units.

For example, event frequency table $42_{E4}$ illustrates the contents of the event frequency table 42 after the management system 10 processes the event E4, and the event frequency table $42_{E5}$ illustrates the contents of the event frequency table 42 after the management system 10 processes the event E5 of FIG. 6. In particular, the management system 10 executes the software routine EventFrequencyTable.AddRecord( ) in order to process the event E5. As a result of executing the software routine EventFrequencyTable.AddRecord ( ), the management system 10 adds an event record to the event frequency table 42.

In particular, the added event record includes an event identifier idEvent of 1 since the event E5 has an event type represented by the event identifier idEvent of 1. Moreover, since the event E5 occurred at a time of 137 units and the first condition defines a time frame cTimeFrame of 5 units for events represented by the event identifier idEvent of 1, the added event record includes an expiration value dtExpire of 142 units. The added event record also includes an initial count value cCountDown of 2 since the first condition defines an occurrence value cOccurrences of 2 for events represented by the event identifier idEvent of 1. The second event record $40_{E5_2}$ of the event frequency table $42_{E5}$ illustrates the added event record after the count value cCountDown is updated by the software function EventFrequenctTest( ).

After executing the software routine EventFrequencyTable.AddRecord( ), the management system 10 executes the software function EventFrequenctTest( ) to determine whether events of the event type represented by the event identifier idEvent of 1 have occurred 2 times within a time frame cTimeFrame of 5 units. To this end, the management system removes each event record from the event frequency table $42_{E4}$ that has expired. Specifically, the management system 10 removes the first event record $40_{E41}$ from the event frequency table $42_{E4}$ because the expiration value dtExpire (i.e. 136) of the first event record $40_{E4_1}$ is less than the time value (i.e. 137) at which the event E5 occurred.

After removing the first event record $40_{E4_1}$, the management system 10 updates the count value cCountDown of each event record corresponding to an event of the event type represented by the event identifier idEvent of 1. Specifically, the management system 10 decreases the count value cCountDown of the third event record $40_{E4_3}$ by 1 and decreases the count value cCountDown of the newly added event record by 1. (See second event record $40_{E5_2}$ of the event frequency table $42_{E5}$)

As a result of decreasing the count value cCountDown of the third event record $40_{E4_3}$, the count value cCountDown equals the threshold value of 0. Accordingly, the management system 10 (i) removes the third event record $40_{E4_3}$ from the event frequency table $42_{E4}$, and (ii) sets the status value Status to a truth value of true. As a result of the status value Status having a truth value of true, the management system 10 determines that events of the event type represented by the event identifier idEvent of 1 have occurred the specified occurrence value cOccurrences of times within the specified time frame cTimeFrame. Accordingly, the management system 10 may trigger actions associated with the condition being met.

While the invention has been illustrated and described in detail in the drawings and foregoing description, such illustration and description is to be considered as exemplary and not restrictive in character, it being understood that only a preferred embodiment has been shown and described and that all changes and modifications that come within the spirit of the invention are desired to be protected.

What is claimed is:

1. A method of detecting when a certain number of events occur within a time frame, comprising the steps of:

causing a database having a plurality of event records to include a first event record in response to a first event occurring;

storing in said first event record a first expiration value that is based upon said first period;

updating said first event record in response to each event that occurs within a first period, said first period commencing in response to occurrence of said first event, said first period corresponding to the time frame;

determining, based upon said plurality of event records, that said certain number of events occurred with the time frame;

removing said first event record from said database in response to said first expiration value indicating that said first period has expired.

2. A method of detecting when a certain number of events occur within a time frame, comprising the steps of:

causing a database having a plurality of event records to include a first event record in response to a first event occurring;

storing in said first event record a first expiration value that is based upon said first period;

updating said first event record in response to each event that occurs within a first period, said first period commencing in response to occurrence of said first event, said first period corresponding to the time frame;

determining, based upon said plurality of event records, that said certain number of events occurred with the time frame; and removing said first event record from said database in response to said first expiration value indicating that a third event occurred after said first period has expired.

3. A method of performing an action in response to a certain number of events of an event type occurring within a time frame, comprising the steps:

updating a first count value in response to each event of said event type that occurs within a first period, said first period commencing in response to occurrence of a first event of said event type, said first period corresponding to the time frame;

storing said first count value and a first expiration value that is based upon said first period in response to said first event occurring;

updating a second count value in response to each event of said event type that occurs within a second period, said second period commencing in response to occurrence of a second event of said event type, said second period corresponding to the time frame;

storing said second count value and a second expiration value that is based upon said second period in response to said second event occurring;

performing said action if (i) said first count value indicates that said certain number of events of said event type has occurred within the time frame, or (ii) said second count value indicates that said certain number of events of said event type has occurred within the time frame;

deleting said first count value and said first expiration value in response to said first expiration value indicating that said first period has expired; and deleting said second count value and said second expiration value in response to said second expiration value indicating that said second period has expired.

4. A method of performing an action in response to a certain number of events of an event type occurring within a time frame, comprising the steps:

updating a first count value in response to each event of said event type that occurs within a first period, said first period commencing in response to occurrence of a first event of said event type, said first period corresponding to the time frame;

storing said first count value and a first expiration value that is based upon said first period in response to said first event occurring;

updating a second count value in response to each event of said event type that occurs within a second period, said second period commencing in response to occurrence of a second event of said event type, said second period corresponding to the time frame;

storing said second count value and a second expiration value that is based upon said second period in response to said second event occurring;

performing said action if (i) said first count value indicates that said certain number of events of said event type has occurred within the time frame, or (ii) said second count value indicates that said certain number of events of said event type has occurred within the time frame;

deleting said first count value and a second expiration value in response to said first expiration value indicating that a third event of said event type occurred after said first period has expired; and deleting said second count value and said second expiration value in response to said first expiration value indicating that said third event of said event type occurred after said second period has expired.

5. A computer readable medium that configures a processor to perform an action in response to a certain number of events of an event type occurring within a time frame, said computer readable medium comprising a plurality of instructions which when executed by said processor causes said processor to:

update a first count value in response to each event of said event type that occurs within a first period, said first period commencing in response to occurrence of a first event of said event type, said first period corresponding to the time frame;

store said first count value and a first expiration value that is based upon said first period in response to occurrence of said first event;

update a second count value in response to each event of said event type that occurs within a second periods said second period commencing in response to occurrence of a second event of said event type, said second period corresponding to the time frame;

store said second count value and a second expiration value that is based upon said second period in response to occurrence of said second event;

perform said action if (i) said first count value indicates that said certain number of events of said event type has occurred within the time frame, or (ii) said second count value indicates that said certain number of events of said event type has occurred within the time frame;

delete said first count value and said first expiration value in response to said first expiration value indicating that said first period has expired; and delete said second count value and said second expiration value in response to said second expiration value indicating that said second period has expired.

6. A computer readable medium that configures a processor to perform an action in response to a certain number of events of an event type occurring within a time frame said computer readable medium comprising a plurality of instructions which when executed by said processor causes said processor to:

update a first count value in response to each event of said event type that occurs within a first period said first period commencing in response to occurrence of a first event of said event type, said first period corresponding to the time frame;

store said first count value and a first expiration value that is based upon said first period in response to occurrence of said first event;

update a second count value in response to each event of said event type that occurs within a second period, said second period commencing in response to occurrence of a second event of said event type, said second period corresponding to the time frame;

store said second count value and a second expiration value that is based upon said second period in response to occurrence of said second event;

perform said action if (i) said first count value indicates that said certain number of events of said event type has occurred within the time frame, or (ii) said second count value indicates that said certain number of events of said event type has occurred within the time frame;

delete said first count value and said first expiration value in response to said first expiration value indicating that a third event of said event type occurred after said first period has expired; and delete said second count value and said second expiration value in response to said second expiration value indicating that a third event of said event type occurred after said second period has expired.

\* \* \* \* \*